United States Patent
Anagnostou et al.

(10) Patent No.: US 12,278,928 B2
(45) Date of Patent: Apr. 15, 2025

(54) METHOD, SYSTEM, AND PROGRAM ELEMENT FOR OPTIMIZING AN ABANDONED CALL NOTIFICATION

(71) Applicant: Unify Patente GmbH & Co. KG, Munich (DE)

(72) Inventors: Sofia Anagnostou, Nea Erythrea (GR); Grant Milner, Erie, CO (US); Athanasios Pagonis, Vrilissia (GR); Zisis Tsiatsikas, Salonika (GR)

(73) Assignee: Unify Beteiligungsverwaltung GmbH & Co. KG, Munich (DE)

( * ) Notice: Subject to any disclaimer, the term of this patent is extended or adjusted under 35 U.S.C. 154(b) by 443 days.

(21) Appl. No.: 17/970,316

(22) Filed: Oct. 20, 2022

(65) Prior Publication Data
US 2023/0224405 A1 Jul. 13, 2023

(30) Foreign Application Priority Data

Jan. 13, 2022 (EP) .................................... 22151430

(51) Int. Cl.
*H04M 3/51* (2006.01)
*H04M 3/42* (2006.01)

(52) U.S. Cl.
CPC ..... *H04M 3/5116* (2013.01); *H04M 3/42357* (2013.01)

(58) Field of Classification Search
CPC ........... H04M 3/5116; H04M 3/42357; H04M 2203/2094; H04M 2242/04; H04L 65/1045; H04L 65/1069; H04W 4/90; H04W 4/029; H04W 4/02; H04W 76/50; H04W 4/025; H04W 64/00
See application file for complete search history.

(56) References Cited

U.S. PATENT DOCUMENTS

| | | | | |
|---|---|---|---|---|
| 8,908,835 | B1 * | 12/2014 | Robbins | H04M 7/006 379/49 |
| 11,159,676 | B1 * | 10/2021 | Ginter | H04M 3/42357 |
| 2008/0090546 | A1 * | 4/2008 | Dickinson | H04M 3/58 455/404.1 |

(Continued)

FOREIGN PATENT DOCUMENTS

WO WO-2019027537 A1 * 2/2019

OTHER PUBLICATIONS

The Extended European Search Report for European Application No. 22151430.3 dated Jun. 9, 2022.

(Continued)

*Primary Examiner* — Akelaw Teshale
(74) *Attorney, Agent, or Firm* — Buchanan Ingersoll & Rooney PC

(57) ABSTRACT

A method for optimizing an abandoned call notification can be configured to address the misrouting of an emergency call which eventually gets abandoned by the caller, through managing the indication of an abandoned call between various network elements, e.g. Emergency Service Internet Protocol network (ESInet) elements. The abandoned call notification can appear in the correct Public Safety Answering Point (PSAP) without any manual action involved in some embodiments. In addition, embodiments can also address calls which are routed in different jurisdictions due to failures in the original intended routing targets.

14 Claims, 4 Drawing Sheets

(56) References Cited

U.S. PATENT DOCUMENTS

| | | | | |
|---|---|---|---|---|
| 2008/0101553 | A1* | 5/2008 | Goldman | H04M 3/5116 |
| | | | | 379/45 |
| 2012/0196558 | A1* | 8/2012 | Reich | G06Q 10/10 |
| | | | | 455/404.1 |
| 2015/0092610 | A1* | 4/2015 | Russell | H04M 15/66 |
| | | | | 370/259 |
| 2016/0173689 | A1* | 6/2016 | Klaban | H04M 7/0075 |
| | | | | 455/404.1 |
| 2016/0373578 | A1* | 12/2016 | Klaban | B60R 25/33 |
| 2018/0013889 | A1* | 1/2018 | Klaban | H04M 3/42195 |
| 2018/0352094 | A1* | 12/2018 | Ginter | H04L 65/1046 |
| 2019/0149661 | A1* | 5/2019 | Klaban | H04M 7/0075 |
| | | | | 379/45 |
| 2022/0201547 | A1* | 6/2022 | Gupta | H04W 4/90 |

OTHER PUBLICATIONS

"NENA Detailed Functional and Interface Standards for the NEA i3 Solution" Prepared by: National Emergency Number Association (NENA) Interconnection and Securing Committee, i3 Architecture Working Group; Sep. 10, 2016.

"Emergency Communications (EMTEL); Core elements for network independent access to emergency services" Draft ETSI TS 103479 vV0.0.14 (Nov. 2019); copyright 2019.

* cited by examiner

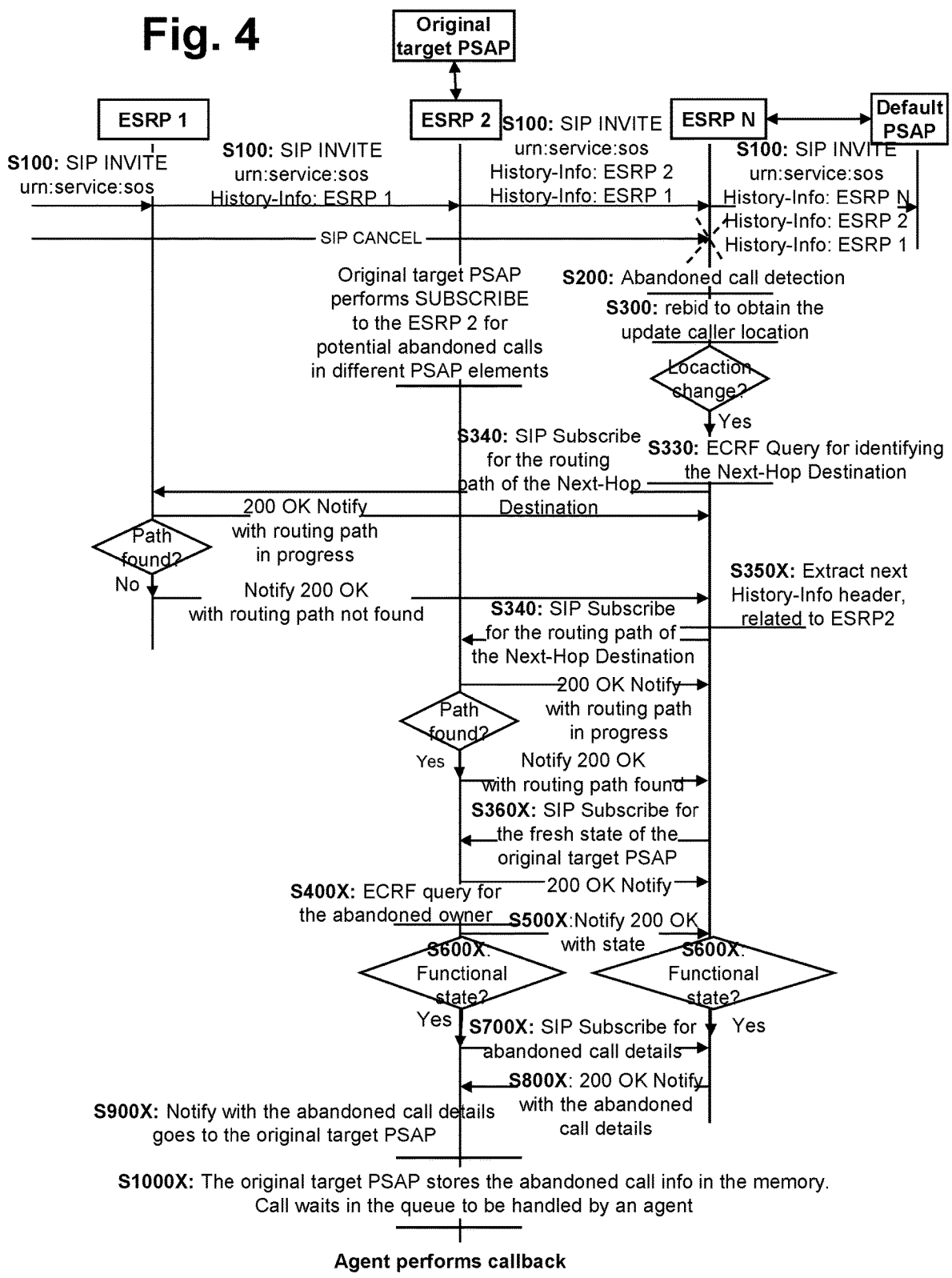

METHOD, SYSTEM, AND PROGRAM ELEMENT FOR OPTIMIZING AN ABANDONED CALL NOTIFICATION

CROSS-REFERENCE TO RELATED APPLICATIONS

The present application claims priority to European Patent Application No. EP 22 151 430.0 filed on Jan. 13, 2022. The entirety of this European patent application is incorporated by reference herein.

FIELD

The present invention relates to a method, a system, and a program element that can be stored in a non-transitory computer readable medium for optimizing an abandoned call notification. Embodiments of the method, the system, and the program element can be related to an emergency network environment or other communication network environment where abandoned calls will result in an abandoned call notification. Embodiments can address the misrouting of an emergency call which eventually gets abandoned by the caller, through managing the indication of an abandoned call between various network elements, e.g. Emergency Service Internet Protocol network (ESInet) elements. The abandoned call notification can appear in the correct Public Safety Answering Point (PSAP) without any manual action involved in some embodiments. In addition, calls which are routed in different jurisdictions due to failures in the original intended routing targets can also be addressed in some embodiments.

BACKGROUND

The misrouting of a call, especially an emergency call, that eventually gets abandoned by the caller can be a problem. For example, such an abandoned call can result in an abandoned call notification in a Public Service Answering Point (PSAP) in case of an emergency call or any other central entity that would otherwise take care of the call, e.g. a call center or similar. However, this PSAP or other entity mighty not be the most applicable to do the (emergency) callback.

Usually, for the case that an abandoned call notification arrives in a wrong or mistargeted PSAP, the PSAP agent is obliged to determine the correct PSAP and call it to inform the appropriate PSAP agent of the abandoned call's data. In some cases, the possibility for misrouting due to wrong configuration rules increases if several route changes occur in the call. Under specific circumstances, such a delay caused by trying to locate the correct PSAP after call misrouting might be fatal. In general, the problem of call misrouting is common in emergency network architectures like the Next Generation (NG) 9-1-1 or NG 1-1-2 architecture. It is often related to the fact that the calls are initiated from wireless callers which often change their geolocation during a call.

Another problem is that calls may be routed in different jurisdictions due to failures in the original intended routing targets. For example, if a PSAP element is busy (i.e. no available agents), or it is under an overload state, the call should be delivered to a different PSAP. If several such hops occur in the call, the possibility for misrouting due to wrong configuration rules increases. Even so, if such a misroute emergency call gets answered, the mistargeted PSAP will probably be able to assist while at the same time locating the correct PSAP and transferring the call accordingly. However, in case of abandoned calls the delays that occur in trying to locate the correct PSAP after call misrouting might be fatal.

SUMMARY

Conventional, state-of-the-art solutions exist for dealing with an unanswered or abandoned call. However, we have recognized and determined that these conventional approaches do not address the issue of how abandoned call indications will be moved to the correct network element so that a corresponding agent can directly perform the callback without the need to take any further manual actions.

We have developed embodiments of a system, apparatus, method, and non-transitory computer readable medium having a program element stored thereon that can be configured to provide a way for the abandoned call notification to appear in the correct PSAP without any manual action involved. Embodiments can be configured to quickly address cases of abandoned calls and to save valuable time by locating the original routing target, evaluating if it is currently available, creating and sending an abandoned call notification to the most applicable PSAP.

A method for optimizing an abandoned call notification is provided that can include arriving, by a call from a caller using a calling device (e.g. smartphone, cell phone, laptop computer, tablet, etc.), on an Emergency Service Routing Proxy (ESRP) element in an Emergency Service Internet Protocol network (ESInet), verifying, by the ESRP element, that the call is considered abandoned; performing, by the ESRP element, a rebid to obtain a fresh update of the caller location; performing, by the ESRP element, an Emergency Call Routing Function (ECRF) query to obtain the routing information of the original routing target Public Safety Answering Point (PSAP) element; sending, by an extracted ESRP destination of the original routing target PSAP, to the ESRP element a Session Initiation Protocol (SIP) Notify message that carries the state of the original routing target P SAP; verifying, by the ESRP element, if the state of the original routing target PSAP is functional; sending, by the ESRP destination, to the ESRP element a SIP Subscribe request message for abandoned call details; and sending, by the ESRP element, to the ESRP destination a SIP Notify message which carries the abandoned call details.

According to a preferred embodiment, the method after the step of sending a SIP Notify message which carries the abandoned call details can include forwarding, by the ESRP destination, to the original routing target PSAP the SIP Notify message, and storing, by the original routing target PSAP, on its memory-queue the abandoned call indication, along with the call details.

According to another preferred embodiment, the method can include verifying, by the ESRP element, if at least one History-Info header exists in a Session Initiation Protocol, (SIP) message of the call. This can occur after the call has arrived at the ESRP element.

According to still another preferred embodiment, the call can be considered abandoned if any CANCEL request is received from the caller.

Further, according to a preferred embodiment, the call may not be considered an abandoned call if in a time period t the processing of the corresponding signaling messages of the emergency call are all exchanged and a CANCEL request is not received. If the call is not detected as abandoned, the default handling process is followed.

According to yet another preferred embodiment, the method can include the following steps, which can be performed after the step of performing a rebid to obtain a fresh update of the caller location. These steps can include: reading out in sequence, by the ESRP element, all History-Info headers of the call and extracting the corresponding ESRP destination in the case no location update is obtained in the previous step; and sending, by the ESRP element, a SIP Subscribe request to the extracted ESRP destination by the ESRP element to the ESRP destination obtained in the previous step to obtain the state of the original routing target PSAP element if call-History-info exists.

In case the ESRP destination is the same element as the ESRP, there is no need for communication with a SUB-SCRIBE/NOTIFY mechanism. The same applies for the next steps which include a communication path between the ESRP destination and the ESRP element.

According to yet another preferred embodiment, wherein in case the state of the original routing target PSAP is not functional, the step of reading out in sequence, by the ESRP element, all History-Info headers of the call and extracting the corresponding ESRP destination can be returned to or repeated.

According to yet another preferred embodiment, wherein in case the caller location is updated, the method can also include performing, by the ESRP element, an ECRF query to identify the responsible target PSAP element; and finding, by the ESRP element and/or the corresponding ESRP destination extracted from the History-Info header, a routing path to the target PSAP element based on the History-Information of the call.

According to yet another preferred embodiment, wherein if a routing path is not found, the method can also include extracting, by the ESRP element, another ESRP destination from the History-Info header and repeating the step of finding a routing path to the target PSAP element based on the History-Information of the call.

According to yet another preferred embodiment, wherein if a routing path is found, the method can include sending, by the ESRP element, to the ESRP destination obtained a SIP Subscribe request message to obtain the state of the original routing target PSAP element; performing, by the ESRP destination, an ECRF query to identify the original routing target PSAP element; sending, by the ESRP destination, to the ESRP element a SIP Notify message that carries the state of the original routing target PSAP and verifying, by the ESRP element, if the state of the original routing target PSAP is functional, in case the state is not functional, then the method returns to the step of extracting another ESRP destination from the History-Info header and repeating the step of finding a routing path to the target PSAP element based on the History-Information of the call; and otherwise: sending, by the ESRP destination, to the ESRP element a SIP Subscribe request message for the abandoned call details in case the state is functional; sending, by the ESRP element, to the ESRP destination a SIP Notify message which carries the abandoned call details; forwarding, by the ESRP destination, to the original routing target PSAP the SIP Notify message; and storing, by the original routing target PSAP, on its memory-queue the abandoned call indication, along with the call details.

According to yet another preferred embodiment, wherein in case the state of the original routing target PSAP is not functional, the method returns to extracting, by the ESRP element, another ESRP destination from the History-Info header and repeating the step of finding a routing path to the target PSAP element based on the History-Information of the call According to yet another preferred embodiment, wherein the method ends if one of the following is present: no History-Info header exists, no History-Info exists, the call is not considered abandoned, or the method is considered complete after the storing step of the abandoned call data.

According to the invention, a corresponding system for optimizing an abandoned call notification is provided, wherein the system is configured to perform an embodiment of the method for optimizing an abandoned call notification or other above discussed method. Embodiments of the system can include at least one PSAP element and/or at least one ESRP element.

A Public Safety Answering Point (PSAP) element can be an entity responsible for receiving emergency calls and processing those calls according to a specific operational policy. The PSAP element can be a communication device that includes a processor connected to a non-transitory memory and at least one transceiver and also be connectable to or include one or more input devices (e.g. a keyboard, a mouse, a touch screen display), one or more output devices (e.g. a display).

An ESRP element can be a can be a computer device that includes a processor connected to a non-transitory memory and at least one transceiver. In some embodiments, an ESRP element can include a server that is a computer device that hosts one or more telecommunication services and has hardware that includes a processor connected to a non-transitory computer readable medium and at least one transceiver. At least one input device and/or output device can also be communicatively connectable to the ESRP element.

According to yet another aspect of the present invention, a program element is provided, which when being executed by a processor is adapted to carry out the steps of the method for optimizing an abandoned call notification. The program element can be stored in non-transitory memory or other non-transitory computer readable medium so that the process can access and run the code of the program element so that the device having the processor performs the method defined by the code of the program element. A non-transitory computer-readable medium can be a solid state drive, a hard drive, a floppy disk, a hard disk, an USB (Universal Serial Bus) storage device, a RAM (Random Access Memory), a ROM (read only memory) or an EPROM (Erasable Programmable Read Only Memory). A computer readable medium may also be considered code stored and available for download via a data communication network, e.g. the Internet, which may allow downloading a program code onto a memory of a device as well.

Embodiments can be configured to provide a way to transfer the indication of an abandoned call between different network elements in the ESInet without engaging the agents. This means that the agents will not have to perform any transfer action in order to identify who is responsible for handling the call. The actual stream will be established in a later time, after the method is executed. Moreover, embodiments of the method can allow for performance of the necessary actions between the network elements with the aim to find the optimal routing target. Embodiments can be adapted so that the agents of a PSAP will not need to perform any action. The abandoned call indication can be moved to the correct element and the corresponding agent will perform the callback directly without the need to talk to a second agent in a different PSAP.

It should also be noted that aspects of the invention have been described with reference to different subject-matters. In particular, some aspects or embodiments have been described with reference to apparatus type claims whereas other aspects have been described with reference to method type claims. However, a person skilled in the art will gather from the above and the following description that, unless otherwise notified, in addition to any combination between features belonging to one type of a subject-matter also any combination between features relating to different types of subject-matters is considered to be disclosed with this text. In particular, combinations between features relating to the apparatus type claims and features relating to the method type claims are considered to be disclosed.

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawings. The various embodiments and/or their individual sub-items and features can be combined with each other in any logical way. Even if some of the embodiments are described on the basis of emergency call networks, they are explicitly not limited to them but can also be applied to other networks of the critical infrastructure or the economy. The drawings include:

FIG. 4 shows in a block diagram an exemplary embodiment of the method for optimizing an abandoned call notification according to an embodiment of the invention that illustrates implementation of the embodiment in a scenario of an updated geolocation of a caller.

Figure 1:
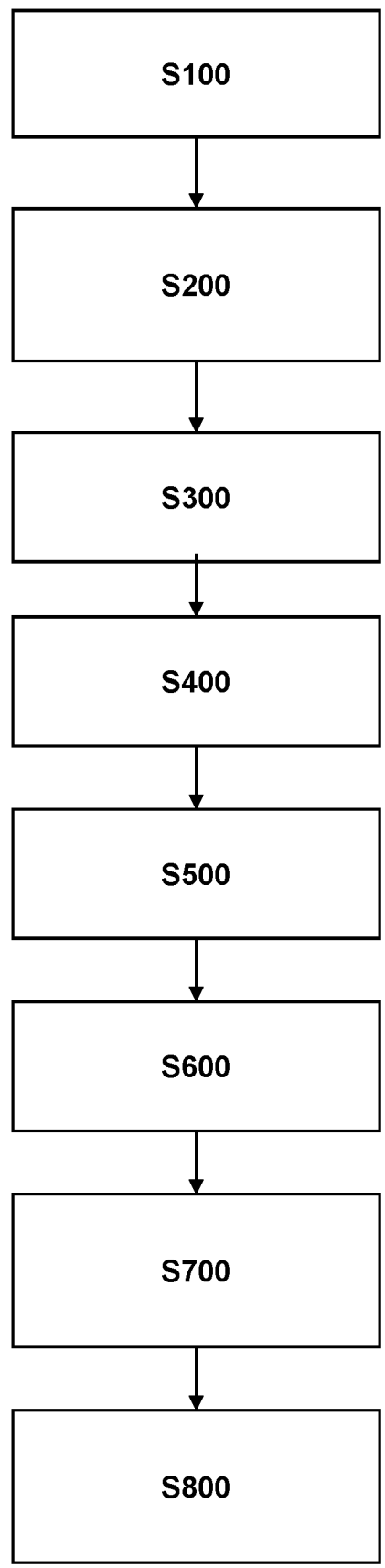
FIG. 1 shows in a block diagram of an overview of an exemplary embodiment of the method for optimizing an abandoned call notification according to an embodiment of the invention.

Reference numerals used in the drawings include:
ESRP N—Emergency Service Routing Proxy N
ESRP 1—Emergency Service Routing Proxy 1
ESRP 2—Emergency Service Routing Proxy 2
Original target PSAP—original target Public Safety Answering Point
Default PSAP—default Public Safety Answering Point

DETAILED DESCRIPTION

FIG. 1 schematically shows in a block diagram an overview of the proposed method according to an embodiment of the invention. In the first step S100, an emergency call arrives on a ESRP N element in the ESInet. In step S200 the ESRP N element identifies an abandoned call indication. In step S300, the ESRP N element performs a rebid to obtain a fresh update of the caller location. In S400, the ESRP i performs an ECRF query, in order to obtain the routing information of the original routing target PSAP element, in this example PSAP A. In S500, the ESRP i element sends back to the ESRP N a SIP Notify that carries the state of the original target PSAP. ESRP N needs this information in order to decide if the abandoned call should be transferred back to the original routing target PSAP element. ESRP N checks in step S600, if the original routing PSAP is in a functional state. If the PSAP is in a functional state, the method proceeds with step S700. In this step the ESRP i element sends to the ESRP N element a SIP Subscribe for abandoned call details. In step S800, the ESRP N element returns back a SIP Notify which carries the abandoned call details.

It should be appreciated that each ESRP can be a computer device that includes a processor connected to a non-transitory memory and at least one transceiver. In some embodiments, an ESRP element can include a server that is a computer device that hosts one or more telecommunication services and has hardware that includes a processor connected to a non-transitory computer readable medium and at least one transceiver. At least one input device and/or output device can also be communicatively connectable to the ESRP element. The ESRPs can be communicatively connected to each other and to the PSAPs.

Each Public Safety Answering Point (PSAP) can be an entity responsible for receiving emergency calls and processing those calls according to a specific operational policy. Each PSAP can be a communication device that includes a processor connected to a non-transitory memory and at least one transceiver and also be connectable to or include one or more input devices (e.g. a keyboard, a mouse, a touch screen display), one or more output devices (e.g. a display). Each PSAP can be communicatively connected to the ESRPs and other PSAPs.

Figure 2:
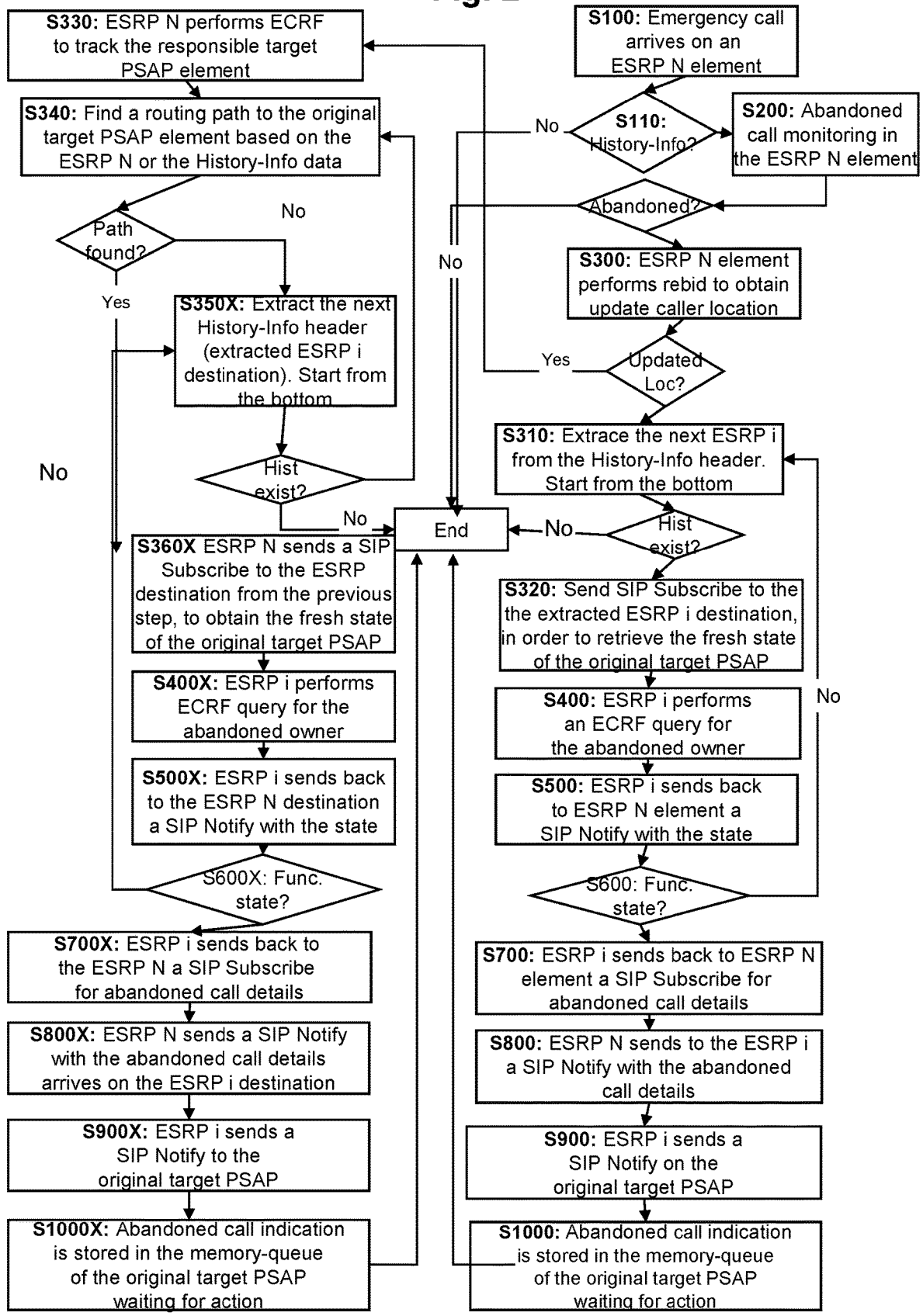
FIG. 2 shows in a block diagram of an overview of another exemplary embodiment of the method for optimizing an abandoned call notification according to an another embodiment of the invention.

FIG. 2 shows in a block diagram an overview of the proposed method according to another embodiment of the invention. Again, as described in FIG. 1, in the first step S100 of this embodiment, an emergency call arrives on a ESRP N element in the ESInet. After that, a check is performed whether History-Info headers exist in the message depicted as S110. If there are no History-Info headers in the SIP message, the method terminates. In the other case, the method is continued with step S200. Here, another check is performed, whether the call is abandoned or not, meaning if a CANCEL request of the callers' device or client is received prior to the call. This check may be performed in a configurable time period t. Wherein, the time period t is related to the processing of the corresponding signaling messages of the call. Thus, if all the messages are exchanged and a CANCEL request is not received, the call is not considered an abandoned call.

If the call is not detected as abandoned, the method ends, and the default handling process is followed. In the latter case, in the step S300, the ESRP N element performs a rebid to obtain a fresh update of the caller location. Then in step S310, if the location is not updated the method extracts the next History-Info header. The method picks the History-Info headers, starting from the bottom and extracts the corresponding node, in this example ESRP i. If there are no more History-Info headers, the method terminates. In a different case, the next step S320 is performed, wherein the ESRP N element sends a SIP Subscribe request to the extracted ESRP i destination, extracted from step S310. The aim of this SIP Subscribe request is to retrieve the update state of the PSAP element which was the original routing target PSAP of the examined call.

In S400, the ESRP i performs an ECRF query, in order to obtain the routing information of the original routing target PSAP element. In S500, the ESRP i element sends back to the ESRP N a SIP Notify that carries the state of the original target P SAP. ESRP N needs this information in order to decide if the abandoned call should be transferred back to the original routing target PSAP element. ESRP N checks in step S600 if the original routing PSAP is in a functional state. If it is not in a functional state, the method loops back to S310 and extracts the next ESRP destination from the next History-Info header.

However, if the PSAP is in a functional state, the method proceeds with step S700. In this step the ESRP i element sends to the ESRP N element a SIP Subscribe for abandoned call details. In step S800, the ESRP N element returns a SIP Notify which carries the abandoned call details. In step S900 the SIP Notify is forwarded from ESRP i to the original target PSAP element. In step S100 the abandoned call indication along with the call details is stored on the memory-queue of the original target PSAP element and the call waits to be handled by an agent.

In case the caller has moved, and his/her location has been updated, the ESRP N element performs then in step S330 an ECRF query in order to track the responsible PSAP element. In step S340, the method tries to find a routing path to the target PSAP element based on the current ESRP N element, or the ESRP i extracted from the History-Info header. From this step till the end of the method this ESRP element will be denoted as ESRP i, even if it is still the ESRP N element.

If the routing path is not found, then in S350X the ESRP N element extracts the next History-Info header, as long as History-Info headers exist, or a path is not found. Otherwise, if a routing path is found in step S360X, the ESRP N sends a SIP Subscribe request to the ESRP i destination obtained from the previous step, with the aim to obtain the state of the original target PSAP element. In case the ESRP i is the same element to the ESRP N, there is no need for communication with a SUBSCRIBE/NOTIFY mechanism. The same applies for the next steps which include a communication path between the ESRP i and the ESRP N element. In step S400X the ESRP i performs an ECRF query for the abandoned owner, i. e. the original target PSAP element. In step S500X, the ESRP i sends back to the ESRP N a SIP Notify message that contains the state of the original target PSAP element. If this is not a functional state after a check in step S600X, then the method returns to step S350X and extracts the next ESRP destination from the next History-Info header. In a different case, the method moves forward to step S700X, wherein the ESRP i element sends back to the ESRP N element a SIP Subscribe message with the abandoned call details. In step S800X, the ESRP N element sends back to the ESRP i a SIP Notify that includes the abandoned call details. In step S900X, the SIP Notify arrives on the original target PSAP element. And finally, in step S1000X, the abandoned call indication along with the call details is stored on the memory-queue of the original target PSAP element and the call waits to be handled by an agent.

Figure 3:
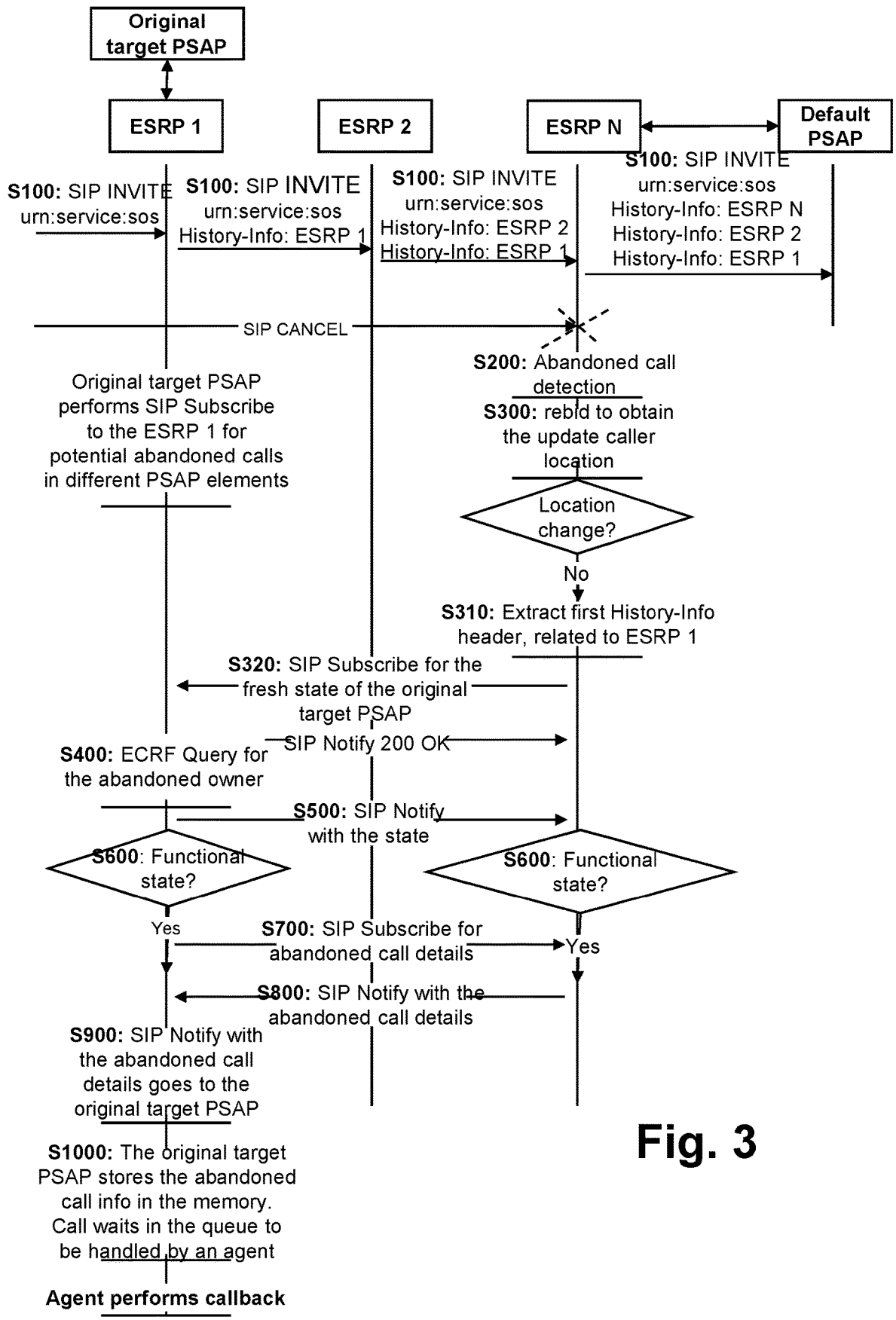
FIG. 3 shows in a block diagram an exemplary embodiment of the method for optimizing an abandoned call notification according to an embodiment of the invention that illustrates implementation of the embodiment in a scenario where the geolocation of a caller does not change.

FIG. 3 shows in a block diagram the proposed method according to another embodiment of the invention for the scenario that the geolocation of a caller does not change. Thus, for this example, it is assumed that from the initiation till the end of the call, the caller remains in the same geofence. In the first step S100, an emergency call arrives on the default PSAP element. The urn:service:sos indicates a uniform resource name which is conveyed over signaling messages in the context of an IP network, so as to point to the emergency service that needs to be requested by an Emergency Calling Routing Function. The SIP INVITE request carries several History-Info headers, which indicates that the call has not been routed on the original-initial recipient (depicted as "History-Info: ESRP 1", "History-Info: ESRP 2" and "History-Info: ESRP N" in FIG. 3). Thereby, the History-Info headers declaring the hops until the SIP INVITE request reaches the PSAP regardless of an optimal route has been selected or even worse has been misrouted.

Then, in step S200 the ESRP N element detects an abandoned call event. In step S300 the ESRP N element performs a rebid request to retrieve a fresh update of the caller location. In this example, there is no new update on the caller location, thus in step S310 the first History-Info header (History-Info: ESRP 1) is extracted. The header extraction is initiated from the bottom because the last position in the History-Info header list, denotes the first element on the network which was unable to route the call in this example.

Further, in step S320, the ESRP N element sends a SIP SUBSCRIBE request for a fresh state of the original target PSAP to the target ESRP 1 of the History-Info header which was extracted on the previous step. This triggers back a SIP Notify message, from the ESRP 1 to the ESRP N element.

In step S400, the target ESRP 1 element which received the SIP SUBSCRIBE performs an ECRF query for the abandoned owner PSAP. In step S500, a SIP NOTIFY is returned to the ESRP N element also conveying the state of the abandoned owner PSAP element.

If after a check in step S600 the state is functional, then in step S700 the extracted ESRP 1 element sends a SIP SUBSCRIBE message to the ESRP N element, that targets the abandoned call details package, devoted to the piece of data related to the abandoned call event.

In step S800, the ESRP N element returns a SIP NOTIFY message to the ESRP 1, that will convey all the necessary abandoned call pieces of information. After that, in step S900 the ESRP 1 element forwards the SIP NOTIFY message to the abandoned owner PSAP element. And finally, in step S1000 the original target PSAP element stores the information that waits on the queue with the abandoned indication, until an agent is available to handle the callback or to take any further action related to this call.

FIG. 4 refers to another embodiment of the invention for the scenario of an updated geolocation of a caller. In the first step S100, an emergency call arrives on the default PSAP element. The SIP INVITE request carries several History-Info headers (History-Info header 1 to N) declaring the hops until the request reaches the PSAP regardless of an optimal route has been selected or even worse has been misrouted. In step S200, the ESRP N element detects an abandoned call event on the default PSAP meaning that either the call request is misrouted or due to the call routing conditions in the previous hops.

In step S300, the ESRP N element performs a rebid request to retrieve a fresh update of the caller location. In this case, there is a new update on the caller location. Based on the new location information, the ESRP N element makes an ECRF query for identifying the Next-Hop destination in step S330.

Then, in step S340, the ESRP N element tries to identify the routing path for the Next-Hop destination. Under normal conditions, the ESRP N element has not configured a routing path for the Next-Hop destination. In this case, the ESRP N extracts the History-Info initiated from the bottom, because the last position in the History-Info header list denotes the first element on the network which was unable to route the call. The ESRP N element sends a SIP SUBSCRIBE request to the target ESRP 1 of the History-Info header which was extracted on a previous step analog to the steps S310 and S320 depicted in FIG. 3, but not shown in FIG. 4. This triggers back a SIP Notify message, from the ESRP 1 to the ESRP N element. In addition, the target ESRP 1 tries to identify a routing path for the Next-Hop.

In this case, a routing path was not found and the target ESRP 1 triggers a SIP Notify message to the ESRP N element with an embedded information like "routing path not found".

In the next step S350X which is similar to the step S310 in FIG. 3, the ESRP N element extracts the next History-Info header, in this case related to ESRP 2. Thus, in step S340, the ESRP N element sends a SIP SUBSCRIBE request to the target ESRP 2 for a routing path of the Next-Hop destination. Thereby, the ESRP 2 is at the second position of the History-Info header list. Again, this target ESRP 2 tries to find a routing path, and, in this example, a routing path is found meaning that target ESRP 2 triggers a SIP Notify message to the ESRP N element with an embedded information like "routing path found".

In step S360X then, the ESRP N element sends a SIP SUBSCRIBE request for the fresh, meaning updated, state of the original PSAP to the target ESRP 2 element. This element then performs an ECRF query for the abandoned owner PSAP depicted in step S400X. Then, in step S500X, a SIP NOTIFY message is returned to the ESRP N element also conveying the state of the abandoned owner PSAP element.

After a check in step S600X, if the state of the owner PSAP element is functional, then, in step S700X, the extracted ESRP 2 element sends a SIP SUBSCRIBE message to the ESRP N element that will target the abandoned call details package devoted to the piece of data related to the abandoned call event. Consequently, the ESRP N element returns a SIP NOTIFY message to the ESRP 2, that will convey all the necessary abandoned call pieces of information shown in FIG. 4 as step S800X. In step S900X the ESRP 2 element forwards the SIP NOTIFY message to the abandoned owner PSAP element. Finally, in step S1000X the original target PSAP element stores the information that waits on the queue with the abandoned indication, until an agent is available to handle the callback or to take any further action related to this call.

It should be noted that the term "comprising" does not exclude other elements or steps and the "a" or "an" does not exclude a plurality. Further, elements described in association with different embodiments may be combined.

It should also be noted that reference signs in the claims shall not be construed as limiting the scope of the claims.

It should also be appreciated that different embodiments of the method, communication system, and communication apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, terminal device, a network, a server, a communication system, and methods of making and using the same have been shown and described above, it is to be distinctly understood that the invention is not limited thereto but may be otherwise variously embodied and practiced within the scope of the following claims.

What is claimed is:

1. A method for optimizing an abandoned call notification, comprising:
    an Emergency Service Routing Proxy (ESRP) element in an Emergency Service Internet Protocol network (ESInet) receiving a call from a caller device of caller;
    verifying, by the ESRP element, that the call is considered abandoned;
    performing, by the ESRP element, a rebid to obtain a fresh update of the caller location;
    performing, by the ESRP element, an Emergency Call Routing Function (ECRF) query to obtain routing information of an original routing target Public Safety Answering Point (PSAP) element for the call;
    sending, by an ESRP destination of the original routing target PSAP, to the ESRP element a Session Initiation Protocol (SIP) Notify message that carries the state of the original routing target PSAP;
    verifying, by the ESRP element, whether the state of the original routing target PSAP is functional;
    sending, by the ESRP destination, to the ESRP element a SIP Subscribe request message for abandoned call details; and
    sending, by the ESRP element, to the ESRP destination a SIP Notify message which carries the abandoned call details.

2. The method of claim 1, comprising:
    forwarding, by the ESRP destination, to the original routing target PSAP the SIP Notify message, and
    storing, by the original routing target PSAP on its memory-queue the abandoned call indication along with the call details.

3. The method of claim 1, comprising:
    verifying, by the ESRP element, whether at least one History-Info header exists in a SIP message of the call.

4. The method of claim 1, wherein the call is considered abandoned if any CANCEL request is received.

5. The method of claim 1, wherein the call is not considered an abandoned call when processing of the corresponding signaling messages of the emergency call are all exchanged in a time period t and a CANCEL request is not received.

6. The method of claim 1, comprising:
    reading out in sequence, by the ESRP element, all History-Info headers of the call and extracting the corresponding ESRP destination in the case no location update is obtain in the previous step; and
    sending, by the ESRP element, a SIP Subscribe request to the extracted ESRP destination by the ESRP element to the ESRP destination obtained in the previous step to obtain the state of the original routing target PSAP element if call-History-info exists.

7. The method of claim 6, comprising:
    in response to a state of the original routing target PSAP being not functional, the ESRP element performs further reading out in sequence, by the ESRP element, all History-Info headers of the call and extracting the corresponding ESRP destination.

8. The method of claim 1, the method comprising:
    in response to caller location being updated after performance of the rebid to obtain the fresh update of the caller location, performing, by the ESRP element, an ECRF query to identify the responsible target PSAP element, and finding, by the ESRP element and/or the ESRP destination, a routing path to the target PSAP element based on the History-Information of the call.

9. The method according to claim 1, comprising:

in response to caller location being updated after performance of the rebid to obtain the fresh update of the caller location, performing, by the ESRP element, an ECRF query to identify the responsible target PSAP element, and attempting to find a routing path to the target PSAP element based on the History-Information of the call; and in response to the routing path not being found, extracting, by the ESRP element, another ESRP destination from the History-Info header and subsequently attempting to find the routing path to the target PSAP element based on the History-Information of the call for that other ESRP destination.

10. The method according to claim 9, comprising:

in response to the routing path not being found:

sending, by the ESRP element, to the ESRP destination obtained a SIP Subscribe request message to obtain the state of the original routing target PSAP element;

performing, by the ESRP destination, an ECRF query to identify the original routing target PSAP element;

ending, by the ESRP destination, to the ESRP element a SIP Notify message that carries the state of the original routing target PSAP, and verifying, by the ESRP element, whether the state of the original routing target PSAP is functional, in case the state is not functional, then the method returns to the attempting to find a routing path to the target PSAP element based on the History-Information of the call;

sending, by the ESRP destination, to the ESRP element a SIP Subscribe request message for the abandoned call details in response to the state being functional;

sending, by the ESRP element, to the ESRP destination a SIP Notify message which carries the abandoned call details;

forwarding, by the ESRP destination, to the original routing target PSAP the SIP Notify message; and storing, by the original routing target PSAP, on its memory-queue the abandoned call indication, along with the call details.

11. The method according to claim 10, wherein in case the state of the original routing target PSAP is not functional, the method returns to the extracting, by the ESRP element, of another ESRP destination from the History-Info header.

12. The of claim 1, wherein the method ends in response to a determination that no History-Info header exists, the call is not considered abandoned, or the method is considered complete.

13. A system for optimizing an abandoned call notification comprising:

an Emergency Service Routing Proxy (ESRP) element positionable in an Emergency Service Internet Protocol network (ESInet), the ESRP element configured to:

receive a call from a caller device of caller;

verify that the call is considered abandoned;

perform a rebid to obtain a fresh update of the caller location;

perform an Emergency Call Routing Function (ECRF) query to obtain routing information of an original routing target Public Safety Answering Point (PSAP) element for the call;

receive from an ESRP destination of the original routing target PSAP a Session Initiation Protocol (SIP) Notify message that carries the state of the original routing target PSAP;

verify whether the state of the original routing target PSAP is functional;

receive a SIP Subscribe request message for abandoned call details from the ESRP destination; and send to the ESRP destination a SIP Notify message which carries the abandoned call details.

14. A non-transitory computer readable medium having a program element stored thereon, the program element defining a method for optimizing an abandoned call notification, wherein the method is performed when a processor of a computer device runs the program element, the method comprising:

receiving a call from a caller device of caller;

verifying that the call is considered abandoned;

performing a rebid to obtain a fresh update of the caller location;

performing an Emergency Call Routing Function (ECRF) query to obtain routing information of an original routing target Public Safety Answering Point (PSAP) element for the call;

receiving from an ESRP destination of the original routing target PSAP a Session Initiation Protocol (SIP) Notify message that carries the state of the original routing target PSAP;

verifying whether the state of the original routing target PSAP is functional;

receiving a SIP Subscribe request message for abandoned call details from the ESRP destination; and sending to the ESRP destination a SIP Notify message which carries the abandoned call details.

\* \* \* \* \*